United States Patent [19]

Lupke et al.

[11] 4,325,685

[45] Apr. 20, 1982

[54] APPARATUS FOR PRODUCING THERMOPLASTIC TUBING HAVING INTERCHANGEABLE MOLD BLOCKS

[76] Inventors: Manfred A. A. Lupke, 35 Ironshield Crescent; Gerd P. H. Lupke, 46 Stornoway Crescent, both of Thornhill, Ontario, Canada

[21] Appl. No.: 186,625

[22] Filed: Sep. 12, 1980

[51] Int. Cl.³ .............................................. B29C 17/07
[52] U.S. Cl. .................................. 425/183; 264/508; 425/185
[58] Field of Search ................. 425/183, 185; 264/508

[56] References Cited

U.S. PATENT DOCUMENTS

| | | | |
|---|---|---|---|
| 3,286,305 | 11/1966 | Seckel | 425/185 X |
| 3,430,292 | 3/1969 | Bauman et al. | 425/183 |
| 3,746,487 | 7/1973 | Andrews | 425/183 X |
| 3,881,851 | 5/1975 | Allanic et al. | 425/185 X |

Primary Examiner—Jan H. Silbaugh
Attorney, Agent, or Firm—Ridout & Maybee

[57] ABSTRACT

In an apparatus for producing thermoplastic tubing, the apparatus being of the type comprising a pair of complementary mold assemblies providing recirculating mold units which cooperate in pairs along a forward run to define a mold cavity, each mold unit comprises a transversely displaceable die member providing a plurality of half molds which can be selectively displaced to an operative position. The apparatus includes selectively operable cam means positioned along the return runs of the mold units for selectively engaging the die members. The half molds in each die member are configured differently, there being at least one with a smooth inner surface and at least one with a corrugated inner surface.

8 Claims, 5 Drawing Figures

APPARATUS FOR PRODUCING THERMOPLASTIC TUBING HAVING INTERCHANGEABLE MOLD BLOCKS

This invention relates to an apparatus for use in the production of thermoplastic tubing, in which a continuously extruded tube of thermoplastic material is expanded by blow molding or vacuum forming within a tubular mold cavity, the mold cavity being formed by cooperating pairs of mold units which are advanced progressively as the tube is extruded. More specifically, the apparatus is of the type comprising a frame structure and pair of complementary mold assemblies mounted thereon, each mold assembly comprising an endless chain of articulately interconnected mold units which are recirculated along an endless path defining a forward run and a return run, the mold units providing respective half molds cooperating in pairs along said forward run to define a longitudinally extending mold cavity. One such apparatus is disclosed in, for example, U.S. Pat. No. 3,981,663 issued on Sept. 21, 1976 to G. P. H. Lupke.

Apparatus of this type is commonly used in the continuous production of corrugated plastic tubing, the configuration of the tubing being determined by the configurations of the inner surfaces of the half molds of the mold units. In order to change the configuration of the molded tubing, for example from the corrugated configuration to a smooth walled configuration or in any other manner, it is necessary to replace the mold units and in prior art apparatus such replacement is an awkward time consuming procedure which involves shutting down the machine so that the mold units can be replaced. The shut down necessarily involves loss of production time, and this is especially disadvantageous in the production of tubing having alternating corrugated and smooth walled sections wherein the mold units must be replaced frequently during a run.

It is an object of the present invention to provide an apparatus of the type referred to above, wherein each mold unit provides a plurality of mold configurations which can be selected as required without the necessity of dismantling the mold units or shutting down the apparatus.

According to the present invention, this is achieved by constructing each mold unit as a composite unit comprising a rigid support member and a die member mounted thereon, the die member providing a plurality of transversely separated half molds, and said members providing respective interengaging guide means permitting transverse displacement of the die member for moving any selected half mold thereof to the operative position. For the purpose of selectively moving the die members in this way, the apparatus further comprises selectively operable cam means mounted on the frame of the apparatus, the cam means being engageable, when operated, with the die members along the return runs.

In order that the invention may be readily understood, two embodiments thereof will now be described by way of example with reference to the accompanying drawings, in which.

Figure 1:
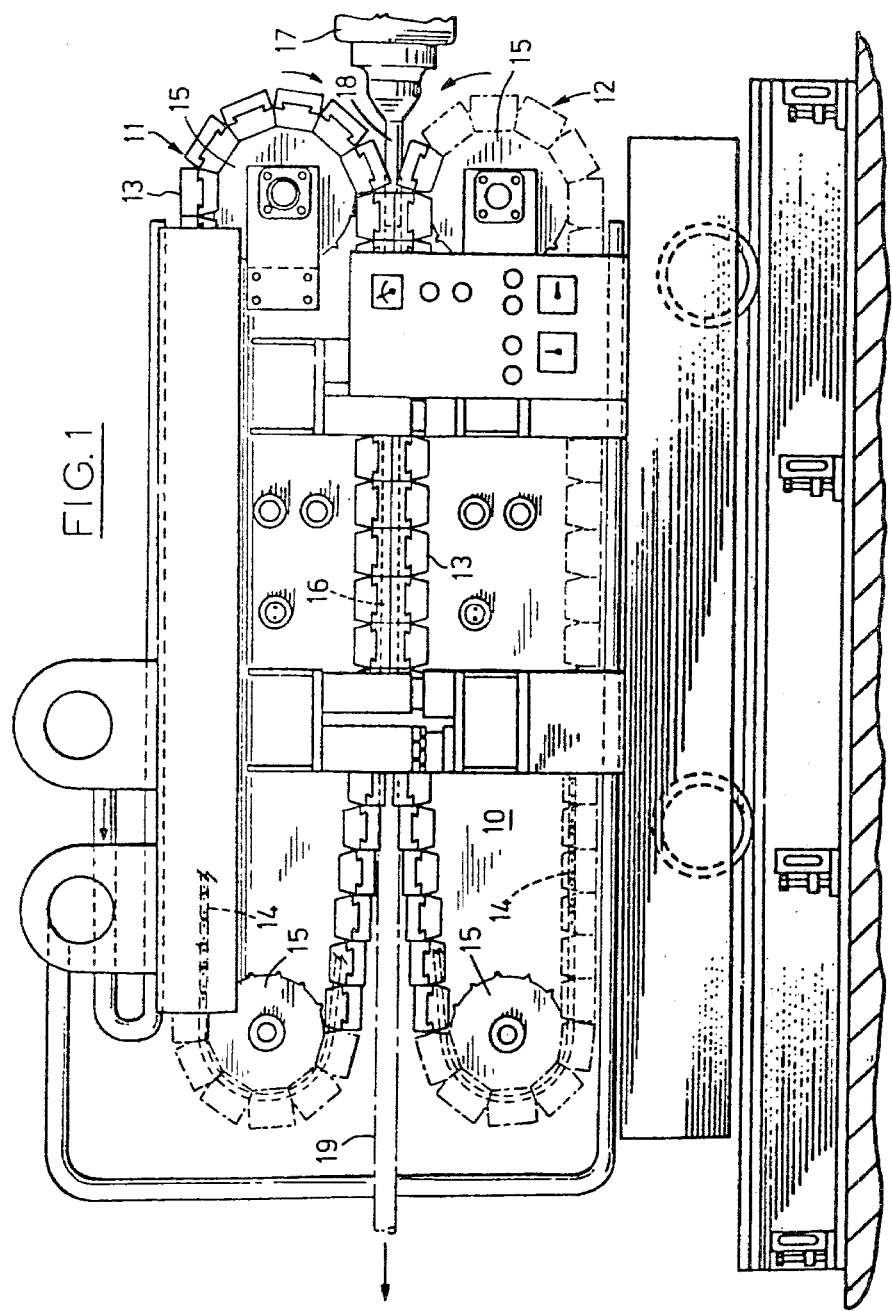
FIG. 1 is a side elevational view, partly in section, of the apparatus.

The apparatus shown in FIG. 1, although somewhat simplified for clarity of illustration, is basically an apparatus of the type disclosed in the above-identified U.S. Pat. No. 3,981,663. The apparatus comprises essentially a rigid support frame structure 10 with a pair of complementary mold assemblies, namely an upper mold assembly 11 and a lower mold assembly 12, mounted thereon. Each mold assembly comprises an endless chain of articulately interconnected mold units 13 which are recirculated along an endless path defining a forward run and a return run. For this purpose the mold units of the two assemblies are secured to respective chains 14 which extend round drive sprockets 15 coupled to a suitable drive motor (not shown). The chains are driven in synchronism with one another. The mold units 13 of the mold assemblies provide hemi-cylindrical half molds which cooperate in pairs along the forward runs so as to define a longitudinally extending mold cavity 16. An extrusion unit 17 providing an extrusion nozzle 18 is arranged at the entrance to the mold cavity 16, the nozzle 18 being positioned coaxially with the cavity. As described in the above-mentioned U.S. patent, a tube of thermoplastic material is continuously extruded into the mold cavity 16 and molded by internal blow molding to the configuration determined by the mold units. As shown in FIG. 1, the tubing 19 is molded to a corrugated configuration. The system for blow molding the extruded plastic material is fully described in the above-identified U.S. patent, and forms no part of the present invention. Indeed, the plastic material could equally well be molded to the required configuration by vaccum forming, as is well known in the art.

The present invention is particularly concerned with the structural means by which the half molds of the mold units may be changed selectively for producing different mold configurations without dismantling the mold units from the mold assemblies. These structural means are illustrated in detail in the subsequent figures.

Figure 2:
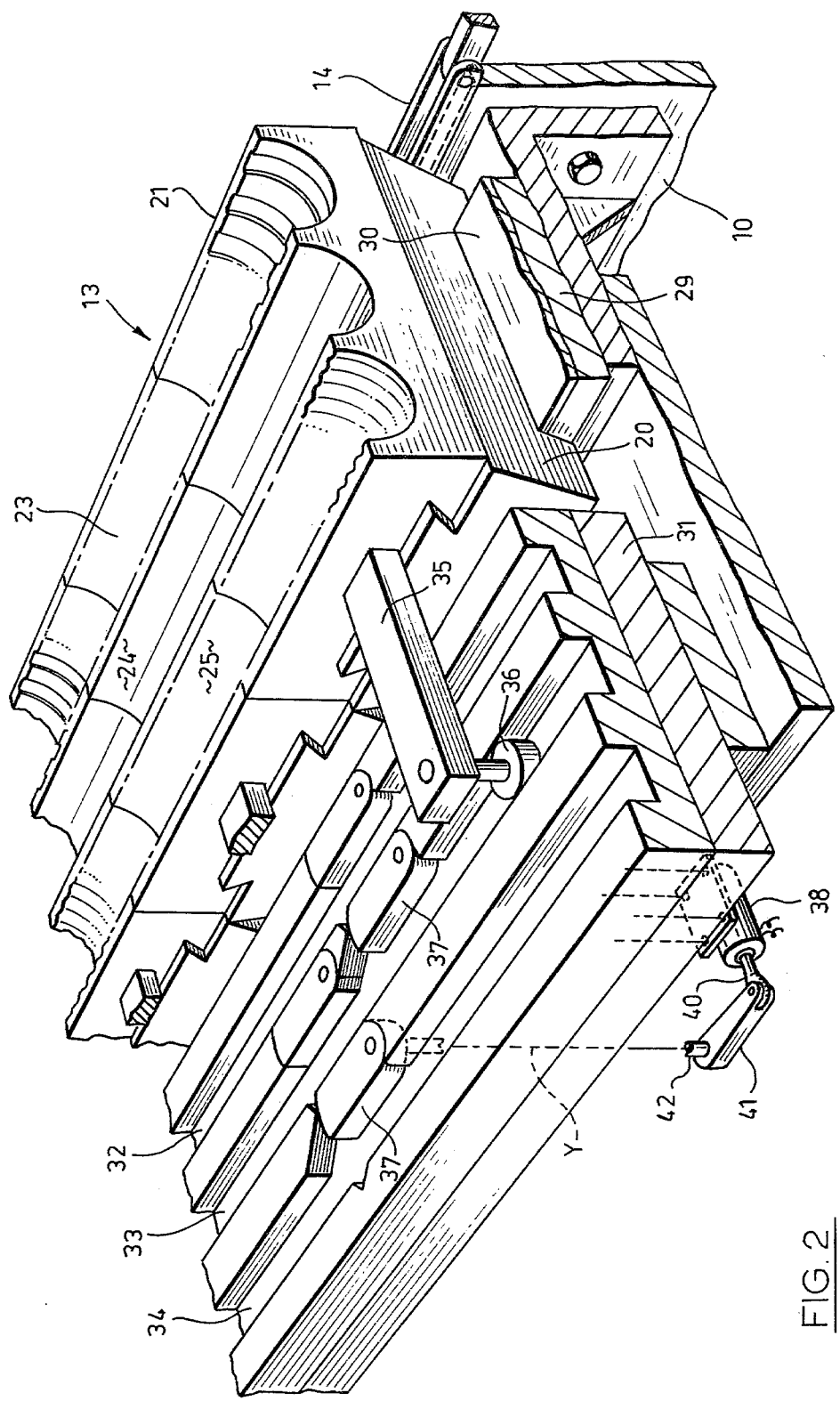
FIG. 2 is a perspective view showing a detail of one cam means for effecting displacement of the die members along the return runs thereof.
Figure 4:
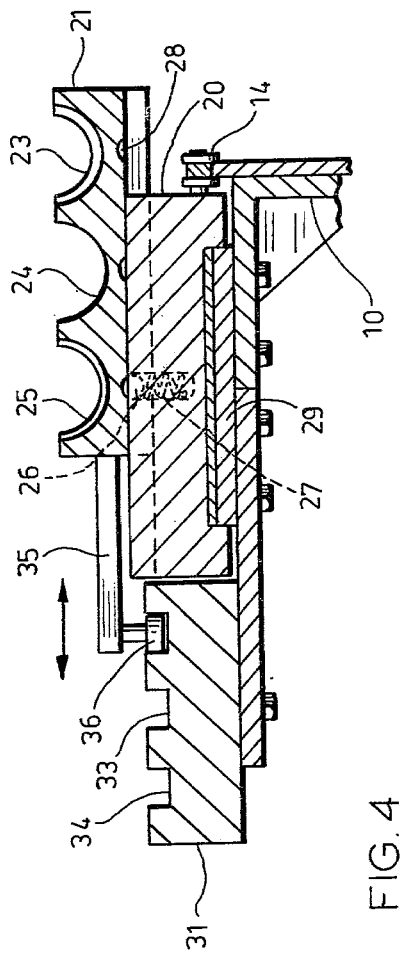
FIG. 4 is a transverse cross section of FIG. 2.

Referring to FIG. 2, each of the mold units 13 is a composite unit comprising essentially a rigid support block 20 and a die member 21 carried by the support member. The support members 20 are connected directly to the endless chains 14 by which they are articulately interconnected. The outer face of the support member 20 (i.e. the upper face as seen in FIG. 2) is formed with a transversely extending dovetail key 22, which keys into a transverse keyway formed in the cooperating face of the die member 21 thereby providing for sliding engagement of the two members and transverse displacement of the die member 21 with respect to the support member 20. The operative face of each die member 21 is formed with a plurality of transversely separated half molds, there being in the present case three such half molds 23, 24, 25 whose inner surfaces are configured differently. The inner surfaces of the half molds 23 and 25 are transversely corrugated while the inner surface of the half mold 24 is smooth. By appropriately displacing the die member 21 with respect to the support member 20, each of these half molds can be selectively moved to the operative position in which it will cooperate with a complementary half mold of the other assembly to form the mold cavity 16. As illustrated in FIG. 4, the die member 21 can be positively located in each of three positions in which a respective one of the half molds 23, 24 and 25 is in the operative position, by means of interengaging spring-loaded detent means in the cooperating faces of the members 20, 21. Thus, a spring-loaded ball 26 located in a pocket 27 of the support member 20 bears on the cooperating face of the die member 21 and is selectively engageable in each of three transversely spaced detents 28 for locating the member 21.

Figure 3:
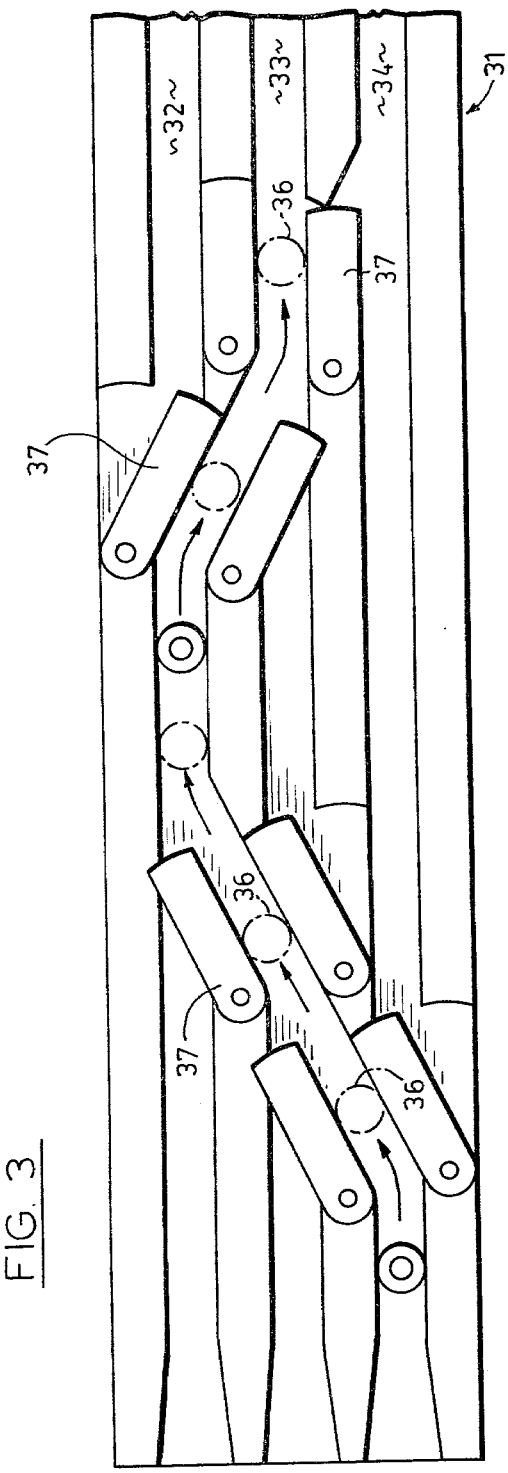
FIG. 3 is a plan view showing part of the cam means of FIG. 2.

A guide plate 29 mounted on the frame structure 10, and provided with a wear plate 30 on its upper surface, extends longitudinally along a portion of the return run of the mold units. The guide plate 29 keys into a recess on the inner face of each support member, permitting the support member to slide readily along the wear plate 30 but preventing the support member from being displaced transversely from the line of travel. For effecting transverse displacement of the die member 21 with respect to the support member 20, a rigid support structure 31 is mounted on the frame structure 10 alongside the guide plate 29 and transversely spaced therefrom. The upper face of the support structure 31 is formed with three parallel longitudinally extending, guideways 32, 33, 34, which serve as cam slots. Each of the die members 21 carries a bar 35 which extends transversely from one of its sides, and a cam follower 36 located on the bar 35 engages in one of the cam slots 32, 33 or 34 to locate the die member transversely with respect to the support member 20. The die member 21 can be displaced to bring a second half mold thereon to the operative position by causing the cam follower 36 to transfer to an adjacent cam slot. Such transfer is effected by pairs of pivoted gate members 37 which, as illustrated diagramatically in FIG. 3, can be pivoted for selectively connecting the cam slots in pairs so as to divert the cam followers 36, and therefore displace the die members 21, as the mold units are driven along the return run. The gate members 37 are selectively moved between their undeflected and deflected positions by electromagnetic devices, one for each gate member. FIG. 2 illustrates one such device, which comprises a solenoid 38 mounted on the underside of the support structure 31, energizing current being supplied to the solenoid by way of wires indicated at 39. The solenoid has an armature connected to a plunger 40, which acts through a lever 41 for moving the gate member 37 about its pivotal axis Y through a shaft 42.

For the purpose of changing the configuration of the mold cavity 16 during operation of the apparatus, it is necessary to select in advance the particular mold units to be changed. The solenoids 38 are appropriately energized for deflecting selected pairs of gate members 37 which thereby engage the cam followers 36 as the mold units return along the return run thereby displacing the die members to bring the selected half molds thereof to the operative position.

Figure 5:
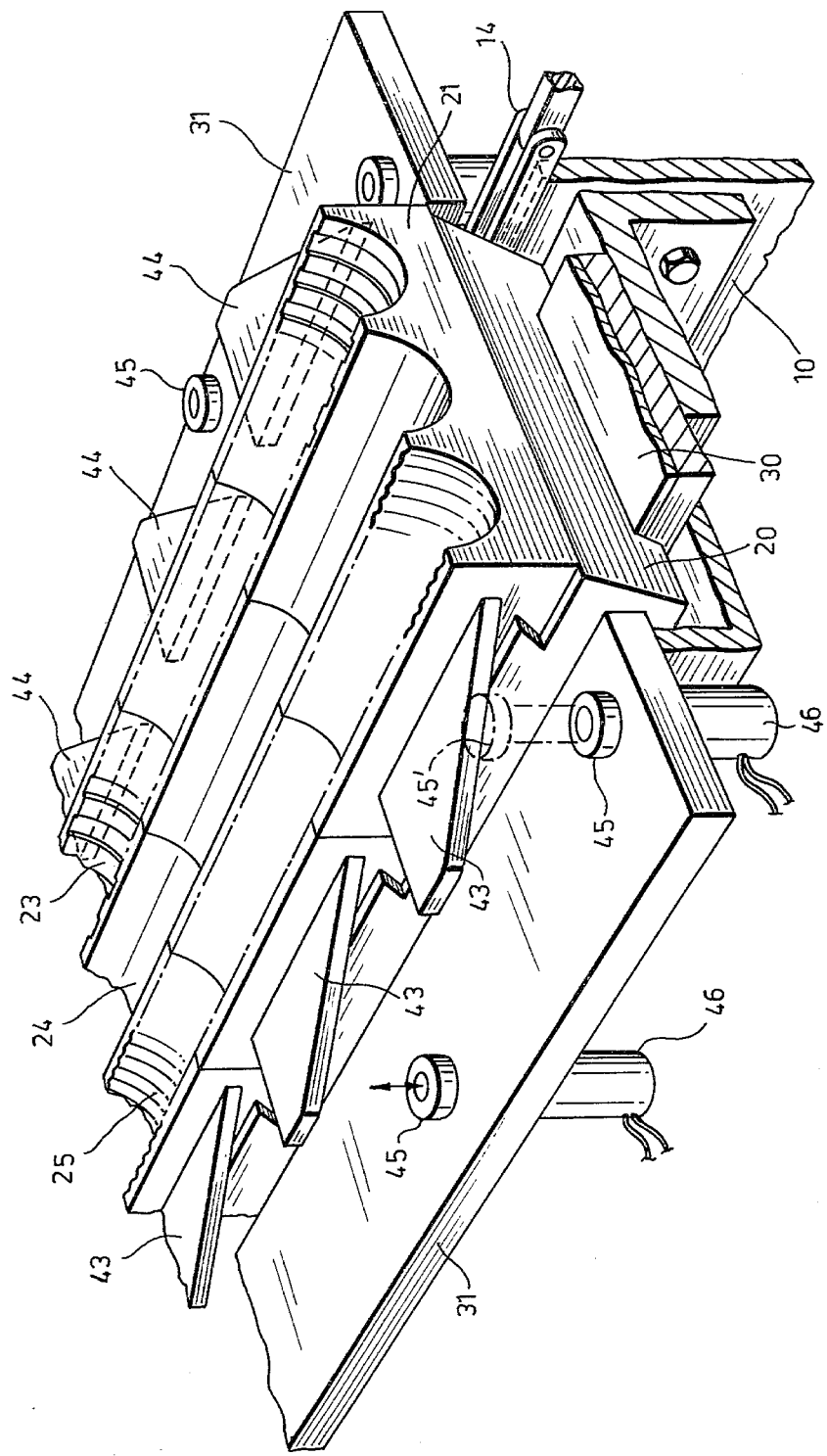
FIG. 5 is a view corresponding to FIG. 2 of a second cam arrangement for effecting displacement of the die members.

FIG. 5 shows a detail of an alternative cam mechanism in which each of the die members 21 is formed with a pair of cam plates 43, 44 extending transversely from its opposite sides. The frame structure 10 carries a pair of rigid support structures 31, positioned adjacent the guide plate 29 on either side thereof, and selective displacement of the die members 21 is effected by the selective operation of cam engaging members 45 mounted on the support structures 31, and operated by solenoids 46. Each of the cam engaging members 45 is normally in a retracted position so as to be cleared by the cam plates 43, 44, but can be operated so as to extend into the path of the cam plates as shown in broken line at 45'. Thus each of the half molds of each die member 21 can be brought selectively to the operative position by selective energization of the appropriate solenoid 46.

What we claim is:

1. In an apparatus for producing thermoplastic tubing, the apparatus comprising a frame structure and a pair of complementary mold assemblies mounted thereon, each mold assembly comprising an endless chain of articulately interconnected mold units which are recirculated along an endless path defining a forward run and a return run, the mold units providing respective half molds cooperating in pairs along said forward run to define a longitudinally extending mold cavity, the improvement in which each mold unit comprises a rigid support member and a die member mounted thereon, the die member providing a plurality of transversely separated half molds, and said members providing respective interengaging guide means permitting transverse displacement of the die member for selectively moving the half molds thereof to a predetermined operative position, the apparatus further comprising selectively operable cam means mounted on said frame structure, said cam means being engageable with said die members along said return runs for displacing said die members thereby to bring the selected half molds thereof to the operative position, said frame structure further providing, for each mold assembly, a longitudinally extending guide member engaging said support members along the return run thereof, and a rigid support structure adjacent said guide member transversely spaced therefrom, said cam means comprising respective first cam means extending transversely from said die members, and selectively operable second cam means mounted on said support structure, said second cam means being selectively engageable with said first cam means for displacing said die members during such engagement.

2. The improvement claimed in claim 1, wherein said interengaging guide means are constituted by a transversely extending key and complementary keyway formed respectively on cooperating faces of said members.

3. The improvement claimed in claim 1, said first cam means comprising respective cam followers extending transversely from said die members, and said second cam means comprising a cam plate mounted on said support structure, the cam plate providing a plurality of parallel longitudinally extending guideways engaging said cam followers, and selectively operable gate members interconnecting said guideways, said gate members being selectively engageable with said cam followers for displacing the cam followers between adjacent guideways for transversely displacing said die members.

4. The improvement claimed in claim 3, wherein the cooperating faces of said die members and support members provide interengaging spring-loaded detent means for positively locating the die members with respect to the support members.

5. The improvement claimed in claim 1, said cam means comprising respective cam plates extending transversely from said die members on opposite sides thereof and selectively operable cam engaging members mounted on said rigid support structures, said cam engaging members being selectively engageable with said cam plates for displacing the die members.

6. The improvement claimed in claim 5, wherein the cooperating faces of said die members and support members provide interengaging spring-loaded detent means for positively locating the die members with respect to the support members.

7. The improvement claimed in claim 6, wherein said cam engaging members comprise electromagnetically operated plungers, said plungers being normally retracted from engagement with the cam plates and being selectively operable to engage the cam plates.

8. The improvement claimed in claim 1, wherein the transversely separated half molds defined by each die member include at least one half mold having a smooth inner surface and at least one half mold having a transversely corrugated inner surface.

* * * * *